United States Patent
Brunelle

[11] Patent Number: 5,907,025
[45] Date of Patent: May 25, 1999

[54] METHOD FOR CONDUCTING LEWIS ACID-CATALYZED REACTIONS

[75] Inventor: Daniel Joseph Brunelle, Burnt Hills, N.Y.

[73] Assignee: General Electric Company, Schenectady, N.Y.

[21] Appl. No.: 08/863,150

[22] Filed: May 27, 1997

[51] Int. Cl.$^6$ .................................................. C08G 63/82
[52] U.S. Cl. ..................... 528/182; 528/186; 528/274; 528/297
[58] Field of Search ................. 528/274, 297, 528/182, 186

[56] References Cited

U.S. PATENT DOCUMENTS

| | | | |
|---|---|---|---|
| 4,273,712 | 6/1981 | Williams, III | 548/461 |
| 4,499,285 | 2/1985 | Evans | 548/461 |
| 5,132,423 | 7/1992 | Brunelle et al. | 544/162 |
| 5,229,482 | 7/1993 | Brunelle | 528/125 |
| 5,283,358 | 2/1994 | Olofson et al. | 560/106 |
| 5,348,923 | 9/1994 | Gauthier et al. | 502/62 |

*Primary Examiner*—Tae Yoon
*Attorney, Agent, or Firm*—Noreen C. Johnson; Douglas E. Stoner

[57] ABSTRACT

Esterification reactions conducted in the presence of Lewis acids, including the reactions between aromatic carboxylic acids and alcohols and between epoxides and carboxylic acids, may be conducted with the use as the catalyst of a hexaalkylguanidinium or α,ω-bis(pentaalkylguanidinium) alkane salt such as hexaethyiguanidinium chloride or bromide.

15 Claims, No Drawings

METHOD FOR CONDUCTING LEWIS ACID-CATALYZED REACTIONS

BACKGROUND OF THE INVENTION

This invention relates to chemical reactions performed in the presence of Lewis acids as catalysts. More particularly, it relates to a genus of compounds useful as such catalysts.

Numerous types of chemical reactions proceed best when catalyzed by Lewis acids. By "Lewis acid" is meant a compound that can accept an electron pair. Numerous types of Lewis acids are known, and many of them are transition metal compounds, especially the halides. Illustrative compounds are ferric chloride, aluminum chloride, zinc chloride and stannous chloride.

Lewis acid-catalyzed reactions include many forms of esterification. For example, the reaction of an aromatic carboxylic acid with an alcohol is best conducted in the presence of a Lewis acid. The same is true of the reactions of carboxyiic acids with epoxides. In each case, the product is an ester of the carboxylic acid.

It is of interest to develop new kinds of Lewis acids, particularly in the form of organic compounds. Since many esterification reactions take place at relatively high temperatures, Lewis acid-active organic compounds which are stable under high temperature conditions are especially desirable.

Hexaaikylguanidinium salts are known, as is their use as phase transfer catalysts is known. As disclosed, for example, is U.S. Pat. Nos. 5,116,975 and 5,229,482, they may be employed in various reactions ultimately yielding polyimides as products. They are also known for their high thermal stability when so used.

SUMMARY OF THE INVENTION

The present invention is based on the discovery that in addition to serving as excellent phase transfer catalysts, hexaalkyiguanidinium and similar salts may be employed as Lewis acid catalysts in esterification reactions. Their use as such often affords the product of the esterification reaction in high yield, and their high thermal stability permits the employment of temperatures higher than those survived by many organic compounds.

Accordingly, the invention is a method for carrying out an esterification reaction which occurs in the presence of a Lewis acid as catalyst and wherein one reactant is a carboxylic acid or functional derivative thereof which comprises employing as said Lewis acid at least one hexaalkylguanidinium or α,ω-bis(pentalkylguanidinium)alkane salt.

DETAILED DESCRIPTION PREFERRED EMBODIMENTS

The reactions which may be conducted by the method of this invention are esterification reactions between a carboxylic acid or functional derivative thereof and a compound selected from such types as alcohols and epoxides. By "functional derivative" of a carboxylic acid is meant such compounds as acid halides and anhydrides. Acid halides, especially chlorides, are often preferred.

The invention is particularly applicable to (1) the reaction between aromatic carboxylic acid halides and alcohols, typically designated the "Schotten-Bauman reaction", and (2) the reaction between epoxides and carboxylic acids. The latter reaction generally involves attack by the carboxylic acid group on an epoxide carbon atom, with the generation of a hydroxy group in the 2-position.

The carboxylic acid or derivative thereof which is employed may be monomeric or polymeric. Illustrative monomeric carboxylic acids and their derivatives are benzoic acid, methyl hydrogen terephthalate, terephthalic acid, benzoyl chloride and terephthaloyl chloride. Among the products which may be obtained by the use of such acids or derivatives are linear, high molecular weight polyesters and macrocyclic polyester oligomers.

Illustrative polymeric acids are acid-terminated polyesters and polyamides. Among the products which may be thus produced are capped polyesters, having decreased reactivity because of the absence of free carboylic acid groups.

The catalysts employed according to the invention are the hexaalkylguanidinium and α,ω-bis(pentaalkylguanidinium) alkane salts, which are disclosed in the aforementioned U.S. Pat. Nos. 5,116,975 and 5,229,482, the disclosures of which are incorporated by reference herein. For the sake of brevity, both types of salts are hereinafter sometimes designated simply "guanidinium salt".

Suitable guanidinium salts are represented by the formula

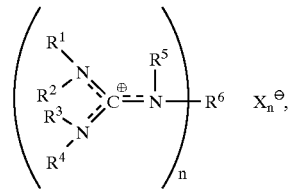

wherein:
each of $R^{1-5}$ is a primary alkyl radical and $R^6$ is a primary alkyl or bis(primary alkylene) radical, or at least one of the $R^1$—$R^2$, $R^3$—$R^4$ and $R^5$—$R^6$ combinations with the connecting nitrogen atom forms a heterocyclic radical;
X is an anion; and
n is 1 or 2.

The alkyl radicals suitable as $R^{1-5}$ include primary alkyl radicals, generally containing about 1–12 and especially 1–6 carbon atoms. $R^6$ is usually an alkyl radical of the same structure or a $C_{2-12}$ alkylene radical in which the terminal carbons are primary; most preferably, it is $C_{2-6}$ alkyl or $C_{4-8}$ straight chain alkylene. Alternatively, any combination of $R^{1-6}$ and the corresponding nitrogen atom(s) may form a heterocyclic radical such as piperidino, pyrrolo or morpholino.

The X value may be any anion and is preferably an anion of a strong acid; examples are chloride, bromide and methanesulfonate. Chloride and bromide ions are usually preferred.

The value of n will be 1 or 2 depending on whether $R^6$ is alkyl or alkylene.

As indicated by the dotted bonds in the formula, the positive charge in the guanidinium salt is delocalized over one carbon and three nitrogen atoms. This is believed to contribute to the salts' stability under the relatively high temperature conditions encountered according to the invention. As a result, decomposition of the guanidinium salt does not occur or occurs only to a very minor extent under the conditions of the invention. The results include suppression of by-product formation and potential for continued use via recycle.

The method of this invention may be conducted under conventional conditions. Such conditions typically involve the use of a solvent, most often a high boiling solvent which permits the attainment of a reaction temperature in the range of about 100–250° C. Illustrative solvents are toluene, xylene, chlorobenzene and o-dichlorobenzene. Molar ratios of the carboxylic acid or derivative thereof to the other reagent are typically in the range of about 0.4–1.0:1. Catalyst proportions are typically maintained in the range of about 0.5–10.0% based on carboxylic acid or derivative thereof. When the reaction is complete, the product may be isolated by conventional techniques.

The method of this invention is illustrated by the following examples.

EXAMPLE 1

A solution of 2.5 mmol of n-hexaneol and 0.5 mmol of hexaethylguanidinium bromide (added as a 0.5M solution in chlorobenzene) in chlorobenzene was heated under reflux and 2 mmol of benzoyl chloride was added. Reaction occurred with evolution of gaseous hydrogen chloride. After 15 minutes, the formation of n-hexyl benzoate was complete as shown by gas chromatography and high pressure liquid chromatography.

EXAMPLE 2

A solution of 1 mmol of methyl hydrogen terephthalate and 2 mmol of cyclohexene oxide in chlorobenzene was heated under reflux and 0.10 mmol of hexaethylguanidinium bromide (as a 0.2M solution in chlorobenzene) was added. The reaction was conducted for 30 minutes, after which analysis by high pressure by liquid chromatography showed that complete conversion to methyl 2-hydroxycyclohexyl terephthalate had occurred.

EXAMPLE 3

A solution of 10.067 mmol of 1,4-butanediol and 0.1 mmol of hexaethylguanidinium chloride (added as a 0.65M solution in o-dichlorobenzene) in chlorobenzene was heated under reflux in a nitrogen atmosphere. Terephthaloyl chloride, 10.067 mmol, was added as a solid, whereupon immediate evolution of hydrogen chloride gas was initiated. After 10 minutes, the product was shown by gel permeation chromatography to be linear poly(1,4-butylene terephthalate) having a weight average molecular weight of 4,000. After the reaction had continued for 1 hour, the molecular weight of the product was 23,000.

A control reaction, conducted without the addition of hexaethylguanidinium chloride, showed no molecular weight build after 10 minutes. After 1 hour, the molecular weight was only 3,200.

EXAMPLE 4

The procedure of Example 3 was repeated, substituting o-dichlorobenzene for the chlorobenzene. The molecular weight of the product polyester after 10 minutes was 18,000.

EXAMPLE 5

A mixture of 10 mmol of bis(4-hydroxybutyl) terephthalate and 10 mmol of terephthaloyl chloride in 30 ml of chlorobenzene was heated to 50° C. and added over 15 minutes to a refluxing solution of 0.5 mmol of hexaethylguanidinium chloride in 30 ml of chlorobenzene. After addition was complete, the mixture was stirred for an additional 10 minutes, cooled and diluted with an equal volume of methylene chloride. The resulting solution was filtered and vacuum stripped, yielding a mixture of macrocyclic poly(1,4-butylene terephthalate) oligomers in 34% yield.

EXAMPLE 6

A solution of 4.4 g of commercial poly(4-butylene terephthalate) in 30 ml of refluxing o-dichlorobenzene was treated sequentially with 1 mole percent of hexaethylguanidinium chloride (307 microliters of a 0.65M solution in o-dichlorobenzene) and 0.8 mmol of 3,4-epoxycyclohexylmethyl 3,4-epoxycyclohexanecarboxylate. The mixture was heated under reflux for 10 minutes and the resulting capped polymer was isolated by precipitation into methanol and filtration. Analysis by Fourier transform infrared spectroscopy showed the absence of free carboxylic acid end groups.

A control reaction conducted without the addition of hexaethylguanidinium chloride showed the presence of carboxylic acid end groups in a concentration of 46 $\mu$eq/g (microequivalents per gram). A similar control using no epoxide and no hexaethylguanidinium chloride afforded a carboxylic acid end group concentration of 55 $\mu$eq/g which was taken as an approximation of the end group concentration of the reactant polyester.

What is claimed is:

1. A method for carrying out an esterification reaction which occurs in the presence of a Lewis acid as catalyst and wherein a first reactant is a carboxylic acid or acid chloride or anhydride thereof and a second reactant is an alcohol or epoxide, which comprises employing as said Lewis acid at least one hexaalkylguanidinium or $\alpha,\omega$-bis(pentaalkylguanidinium)alkane salt.

2. A method according to claim 1 wherein the first reactant is an acid or an acid chloride.

3. A method according to claim 2 wherein the reaction is conducted at a temperature in the range of about 100–250° C.

4. A method according to claim 2 wherein the salt has the formula:

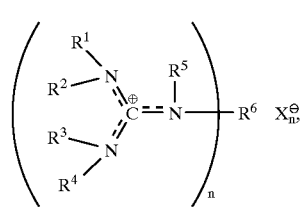

wherein:
each of $R^{1-5}$ is a primary alkyl radical and $R^6$ is a primary alkyl or bis(primary alkylene) radical, or at least one of the $R^1$—$R^2$, $R^3$—$R^4$ and $R^5$—$R^6$ combinations with the connecting nitrogen atom forms a heterocyclic radical;
X is an anion; and
n is 1 or 2.

5. A method according to claim 4 wherein each of $R^{1-6}$ is $C_{1-6}$ alkyl, X is chloride, bromide or methanesulfonate and n is 1.

6. A method according to claim 5 wherein the salt is hexaethylguanidinium chloride or bromide.

7. A method according to claim 2 wherein the reaction is between an aromatic carboxylic acid chloride and an alcohol.

8. A method according to claim 7 wherein the reaction is conducted in a solvent.

9. A method according to claim 8 wherein the carboxylic acid chloride is terephthaloyl chloride.

10. A method according to claim 9 wherein the alcohol is 1,4-butanediol and the product is a linear poly(1,4-butylene terephthalate).

11. A method according to claim 9 wherein the alcohol is bis(4-hydroxybutyl) terephthalate and the product is a mixture of macrocyclic poly(1,4-butylene terephthalate) oligomers.

12. A method according to claim 2 wherein the reaction is between a carboxylic acid and an epoxide.

13. A method according to claim 12 wherein the reaction is conducted in a solvent.

14. A method according to claim 13 wherein the carboxylic acid is carboxy-terminated poly(1,4-butylene terephthalate).

15. A method according to claim 14 wherein the epoxide is 3,4-epoxycyclohexylmethyl 3,4-poxycyclohexanecarboxylate.

* * * * *